(12) United States Patent
Ray et al.

(10) Patent No.: US 11,440,098 B2
(45) Date of Patent: Sep. 13, 2022

(54) THREE-DIMENSIONAL PRINTING SYSTEM OPTIMIZING CONTOUR FORMATION FOR MULTIPLE ENERGY BEAMS

(71) Applicant: LayerWise NV, Leuven (BE)

(72) Inventors: Nachiketa Ray, Leuven (BE); Jan Plas, Wilsele (BE)

(73) Assignee: LAYERWISE NV, Leuven (BE)

( * ) Notice: Subject to any disclaimer, the term of this patent is extended or adjusted under 35 U.S.C. 154(b) by 337 days.

(21) Appl. No.: 16/703,162

(22) Filed: Dec. 4, 2019

(65) Prior Publication Data

US 2020/0206817 A1 Jul. 2, 2020

Related U.S. Application Data

(63) Continuation of application No. 62/785,317, filed on Dec. 27, 2018.

(51) Int. Cl.
| | |
|---|---|
| *B22F 10/20* | (2021.01) |
| *B29C 64/153* | (2017.01) |
| *B33Y 30/00* | (2015.01) |
| *B29C 64/393* | (2017.01) |
| *B33Y 10/00* | (2015.01) |

(Continued)

(52) U.S. Cl.
CPC ............ *B22F 10/20* (2021.01); *B29C 64/153* (2017.08); *B29C 64/393* (2017.08); *B22F 10/30* (2021.01); *B33Y 10/00* (2014.12); *B33Y 30/00* (2014.12); *B33Y 50/02* (2014.12)

(58) Field of Classification Search
CPC ...... B22F 10/20; B29C 64/153; B29C 64/393
See application file for complete search history.

(56) References Cited

U.S. PATENT DOCUMENTS

| 6,861,613 B1 | 3/2005 | Meiners et al. |
| 9,533,372 B2 * | 1/2017 | O'Neill ................ B23K 26/342 |

(Continued)

FOREIGN PATENT DOCUMENTS

| CN | 105903961 | 8/2016 |
| DE | 19935274 C1 | 1/2001 |

(Continued)

OTHER PUBLICATIONS

PCT International Search Report for International Search Authority for PCT/US2019/064440, dated Mar. 10, 2020.

(Continued)

*Primary Examiner* — Joseph S Del Sole
*Assistant Examiner* — John Robitaille (57) ABSTRACT

A system for forming a three-dimensional (3D) article includes a powder dispenser, a fusing apparatus, and a controller. The plurality of energy beams include at least a first beam and a second beam. The controller is configured to operate the powder dispenser to dispense a layer of powder and to operate the fusing apparatus to selectively fuse the layer of powder. Operating the fusing apparatus includes operating the first beam to fuse a first hatch pattern over a first area of the layer of powder and operate at least the second beam to fuse a contour that bounds the hatch pattern. The contour is formed from N scans along the contour. N is an integer that is at least equal to one. N is determined by a lateral alignment uncertainty between at least two of the energy beams.

10 Claims, 6 Drawing Sheets

(51) Int. Cl.
   *B33Y 50/02*        (2015.01)
   *B22F 10/30*        (2021.01)

(56)               References Cited

U.S. PATENT DOCUMENTS

| | | | |
|---|---|---|---|
| 9,878,497 | B2 | 1/2018 | Schwarze et al. |
| 10,201,962 | B2 | 2/2019 | Teulet |
| 2004/0094728 | A1 | 5/2004 | Herzog et al. |
| 2015/0174827 | A1* | 6/2015 | Schwarze .............. B33Y 50/02 |
| | | | 700/120 |
| 2016/0052087 | A1 | 2/2016 | O'Neill |
| 2019/0263065 | A1 | 8/2019 | Huber et al. |

FOREIGN PATENT DOCUMENTS

| | | |
|---|---|---|
| DE | 102016222261 A1 | 5/2018 |
| JP | H04-113828 | 4/1992 |
| JP | H05-315262 A | 11/1993 |
| JP | 2003-505250 | 2/2003 |
| WO | 02-36331 | 5/2002 |
| WO | 200537478 A2 | 4/2005 |
| WO | 2018160807 A1 | 9/2018 |

OTHER PUBLICATIONS

PCT Written Opinion for International Search Authority for PCT/US2019/064440, dated Mar. 10, 2020.
English machine translation of Chinese Publication No. CN 105903961 on Aug. 31, 2016.
International Search Report, dated Nov. 13, 2013, from PCT/EP2013/065783.

* cited by examiner

THREE-DIMENSIONAL PRINTING SYSTEM OPTIMIZING CONTOUR FORMATION FOR MULTIPLE ENERGY BEAMS

CROSS-REFERENCE TO RELATED APPLICATIONS

This non-provisional patent application claims priority to U.S. Provisional Application Ser. No. 62/785,317, Entitled "THREE-DIMENSIONAL PRINTING SYSTEM OPTIMIZING CONTOUR FORMATION FOR MULTIPLE ENERGY BEAMS" by Nachiketa Ray et al., filed on Dec. 27, 2018, incorporated herein by reference under the benefit of U.S.C. 119(e).

FIELD OF THE INVENTION

The present disclosure concerns an apparatus and method for the digital fabrication of three dimensional (3D) articles utilizing powder materials. More particularly, the present disclosure concerns a manufacturing sequence that improves surface and subsurface quality and accuracy of the articles.

BACKGROUND

Three dimensional (3D) printing systems are in rapidly increasing use for purposes such as prototyping and manufacturing. One type of three dimensional printer utilizes a layer-by-layer process to form a three dimensional article of manufacture from powdered materials. Each layer of powdered material is selectively fused using an energy beam such as a laser, electron, or particle beam. Higher productivity printers can utilize multiple energy beams. One challenge with multiple energy beams is a transition from using one energy beam to another at a boundary or contour.

SUMMARY

In a first aspect of the disclosure, a system for forming a three-dimensional (3D) article includes a powder dispenser, a fusing apparatus, and a controller. The powder dispenser is for sequentially dispensing individual layers of powder. The fusing apparatus is configured to generate and scan a plurality of energy beams across a build plane which is a top surface of a dispensed powder layer. The plurality of energy beams include at least a first beam and a second beam. The controller is configured to operate the powder dispenser to dispense a layer of powder and to operate the fusing apparatus to selectively fuse the layer of powder. Operating the fusing apparatus includes operating the first beam to fuse a first hatch pattern over a first area of the layer of powder and operate at least the second beam to fuse a contour that bounds the hatch pattern. The contour is formed from N scans along the contour. The scans are scanned along a variable direction axis S and are offset by a transverse axis T that is normal to S so as to widen the contour with respect to the transverse axis. N is an integer that is at least equal to one. N is determined by a lateral alignment uncertainty between at least two of the energy beams.

The lateral alignment uncertainty can be determined during a calibration procedure. The calibration procedure can be continuously performed or it can be performed periodically. The calibration procedure includes laterally aligning the plurality of energy beams with respect to each other. Laterally aligning means that for a given set of input coordinates, the plural beams on average impinge on a single location on the build plane. The calibration procedure also includes determining a lateral location variability of the alignment of a beam around an average location. The alignment uncertainty for any two beams is equal to the joint lateral location variability of the two beams. This joint locational variability can be equal to one, two, or three standard deviations (assuming a gaussian variability).

The number of plural energy beams can vary. The plurality of energy beams can include a third beam. The controller can operate the second beam to fuse a second hatch pattern before or after fusing the contour. The controller can operate the third beam to fuse a third hatch pattern over a third area of the layer of powder. The fusing apparatus is operable to address and fuse powder over a lateral build plane. At least one of the energy beams can be operable to address the entire build plane. Operation of the plurality of energy beams can be concurrent.

In one implementation the controller is operable to determine the lateral alignment uncertainty and to compute N based upon the lateral alignment uncertainty. N can be monotonically related to the lateral alignment uncertainty. N can be generally proportional to the lateral alignment uncertainty. N times a melt width of a contour scan is at least equal to the lateral alignment uncertainty.

In another implementation the controller is an integrated module that is physically associated or housed with 3D printer hardware including the powder dispenser and fusing apparatus.

In yet another implementation the controller is distributed among a number of different devices which include two or more of a local controller, a host device, a mobile device, and a remote server. The local controller can be physically associated or housed with 3D printer hardware including the powder dispenser and fusing apparatus. The host device can be a desktop computer that is housed separately from the 3D printer hardware. The mobile device can be a laptop computer, a tablet computer, a smartphone, or another mobile client device. The remote server can be accessible by the Internet by portions of the system that are local to the 3D printer hardware.

In a second aspect of the disclosure, a method for manufacturing a 3D article includes determining a lateral alignment uncertainty for a system and determining a number N scans for forming a contour that bounds a hatch pattern. The system includes a powder dispenser and a fusing apparatus. The powder dispenser is for sequentially dispensing individual layers of powder. The fusing apparatus is for generating and scanning a plurality of energy beams including a first beam and a second beam to selectively melt the layers of powder. The lateral alignment uncertainty is with respect to at least the first beam and the second beam. The number N is an integer at least equal to one. The determination is based upon the lateral alignment uncertainty. The plurality of energy beams can include a third beam.

In one implementation, the method further includes operating the powder dispenser to dispense a layer of powder, and operating the fusing device to selectively fuse the dispensed layer of powder. Operating the fusing device includes operating a plurality of energy beams including operating at least the first beam to fuse a first hatch pattern over an area of the layer of powder and operating at least the second beam to fuse a contour using N sequential scans along the contour. The plurality of energy beams can include a third beam. Operation of the beams can be at least partially concurrent. Operating the fusing device can include operating the second beam to fuse a second hatch pattern before or after fusing the contour. Operating the fusing device can include operating the third beam to fuse a third hatch pattern.

In another implementation, N is monotonically related to a magnitude of the lateral alignment uncertainty. N can be proportional to the lateral alignment uncertainty. N times a melt width can be at least equal to the lateral alignment uncertainty.

In a third aspect of the disclosure, a computer-readable storage medium is for manufacturing a three-dimensional (3D) article. The computer-readable storage medium is non-transitory and has computer-readable program code portions stored therein. In response to execution by a processor the computer-readable code portions cause a 3D printing system to determine a lateral alignment uncertainty for a system and to determine a number N of scans for forming a contour. The system includes a powder dispenser and a fusing apparatus. The powder dispenser is for sequentially dispensing individual layers of powder. The fusing apparatus is for generating and scanning a plurality of energy beams including a first beam and a second beam to selectively melt the layers of powder. The lateral alignment uncertainty is at with respect to at least the first beam and the second beam. The number N is an integer at least equal to one. The determination is based upon the lateral alignment uncertainty. The plurality of energy beams can include a third beam.

DETAILED DESCRIPTION OF THE PREFERRED EMBODIMENTS

Figure 1:
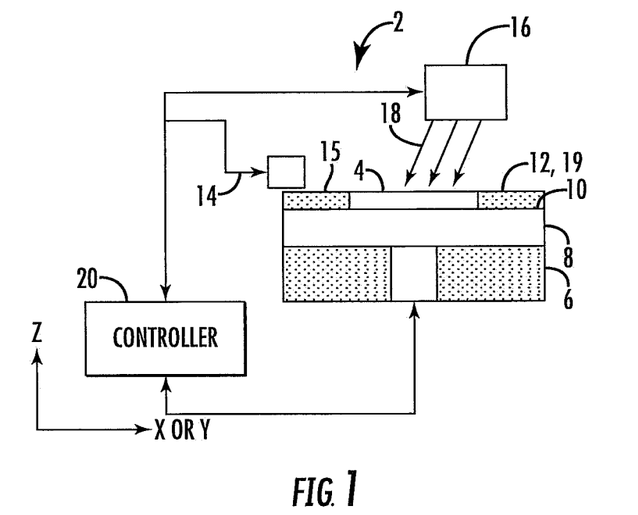
FIG. 1 is a block diagram schematic of a three-dimensional (3D) printing system for fabricating a three-dimensional (3D) article.

FIG. 1 is a block diagram schematic of a three-dimensional printing system 2 for fabricating a three-dimensional article 4. In describing system 2, mutually orthogonal axes X, Y, and Z can be used. Axes X and Y are lateral axes and generally horizontal. Additionally, mutually orthogonal axes S and T can be used. Axis S is used to describe a variable direction along a contour. The axis T is transverse to S. Axis Z is a vertical axis that is generally aligned with a gravitational reference. By "generally" we mean that a measure such as a quantity, a dimensional comparison, or an orientation comparison is by design and within manufacturing tolerances but as such may not be exact.

System 2 includes a build module 6 having a motorized platform 8. The motorized platform 8 has a support surface 10 upon which the three-dimensional article 4 is formed. The motorized platform 8 is configured to vertically position an upper surface 12 (either the upper surface of article 4 or surface 10) at an optimal height to allow a powder dispenser 14 to dispense a layer of powder 15 onto the upper surface. In an illustrative embodiment, the motorized platform 8 will be lowered before or after a layer of powder 15 is dispensed.

In an illustrative embodiment, the dispenser 14 dispenses layers of metal powder upon the motorized support 8. The layers can be any practical thickness but a typical layer thickness can be in a range of 10 to 100 microns. More particularly, a typical thickness can be in a range of 20 to 50 microns.

A fusing apparatus 16 is configured to form and scan a plurality of energy beams 18 over the upper surface 12 of dispensed powder 15 to selectively fuse the powder 15. An energy beam 18 can be a high powered optical beam, a particle beam, or an electron beam. For a fusion of metal powder, a laser that outputs a beam having a power level of more than 100 watts is typical. Some lasers can output 500 watts, 1000 watts, or more than a kilowatt. The fusing apparatus 16 can include a laser, forming optics and scanning optics for forming and scanning the laser beam 18 over the surface 12.

In an embodiment, the plurality of energy beams 18 includes at least a first beam and a second beam. The plurality of energy beams can additionally include a third beam, or any number of beams. The plurality of energy beams 18 can individually be controlled and scanned independently and concurrently. The fusing apparatus 16 is configured to scan the energy beams over a laterally extending "build plane" 19 which is generally proximate to or coincident with the upper surface 12 of the dispensed powder 15. The build plane 19 defines a lateral extent over which the plurality of energy beams 18 can operate. In a particular embodiment, at least one of the energy beams 18 can address the entire build plane 19. In some embodiments, more than one energy beam 18 can individually address the entire build plane 19.

The plurality of energy beams have a lateral alignment uncertainty. This can be defined for two beams. When attempting to address the same position on the build plane with the two beams (defined by their centroids), there is a lateral alignment error. This error can vary due to variability of motion of the scanning mechanism along with other mechanical tolerances. If an attempt is made to repeatedly center each of the beams at a particular point, the lateral alignment tolerance can be equated with a circle bounded by three standard deviations of actual locations.

The motorized platform 8, the powder dispenser 14, and the fusing apparatus 16 are all under control of a controller 20. The controller 20 includes a processor coupled to an information storage device. The information storage device includes a non-transitory or non-volatile storage device that stores software instructions. When executed by the processor, the software instructions control various portions of system 2 including the motorized platform 8, the powder dispenser 14, and the fusing apparatus 16. The software instructions are also referred to as computer-readable code portions. The information storage device is also referred to as a computer-readable storage medium.

The controller 20 can be an integrated module or it can include a plurality of computers that are electrically or wirelessly coupled to one another. In a particular embodiment, the controller 20 includes a local controller that is physically integrated with other portions of system 2, a host computer, and a remote server. When the controller 20 is distributed among multiple computers, there can therefore be distributed processors and information storage devices that are accessed and utilized during the operation of the controller 20.

Figure 2:
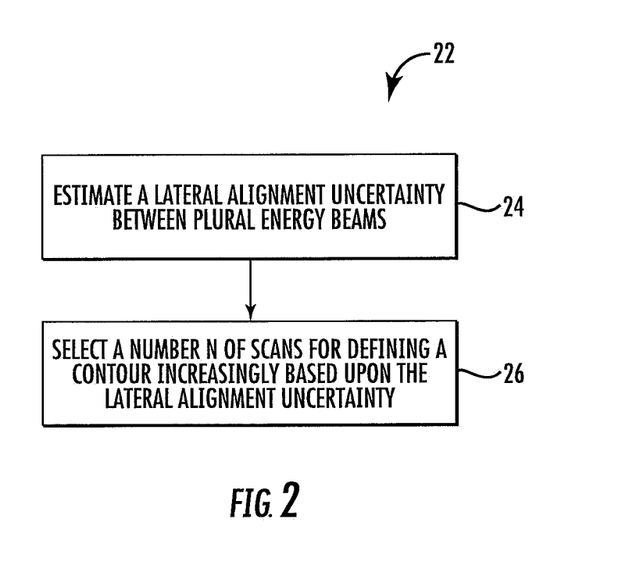
FIG. 2 is a flowchart depicting an embodiment of a method performed by a controller to determine a number of contour scans required to form a contour based upon a lateral alignment uncertainty between plural energy beams.

FIG. 2 is a flowchart depicting an embodiment of a method 22 performed by controller 20. According to 24, the controller estimates a lateral alignment uncertainty between at least two different energy beams 18 of the plurality of energy beams 18. The lateral alignment uncertainty is generally defined along the axis T within the build plane 19. In some embodiments, the lateral alignment uncertainty can be estimated for more than one pair of energy beams 18. In an alternative embodiment, a user can input the lateral alignment uncertainty.

According to 26, a number N of transversely offset scans is selected for forming a contour. The number N is selected at least partially based upon the lateral alignment uncertainty. In one embodiment, the selected value for N can be a monotonically increasing function of the lateral alignment uncertainty. In another embodiment, the selected value for N can be generally proportional to the lateral alignment uncertainty. In yet another embodiment, the selected value for N times a melt width is at least equal to the lateral alignment uncertainty. The melt width is defined as a fused width along the transverse axis T as the energy beam scans along the axis S.

As part of step 24, the fusing apparatus 16 can be calibrated using a calibration procedure. Part of the calibration procedure is to laterally align the energy beams 18. There are a number of techniques that can be used to laterally align beams 18. In one embodiment, a detection system (not shown) is provided to detect where the energy beams impinge upon a substrate surface positioned at the build plane 19. For an individual beam, the controller directs the fusing apparatus 16 to direct the beam to impinge upon a particular location on the surface. The detection system then determines the actual location of the impingement. The controller 20 can compare the actual location to an intended location and then compute a lateral error in X and Y. This can be repeated a number of times to determine an average error and standard deviation. The average errors for different beams 18 can be used to align the beams. The standard deviation (lateral variation for a single intended location) can be used to determine the lateral alignment uncertainty.

Figure 3:
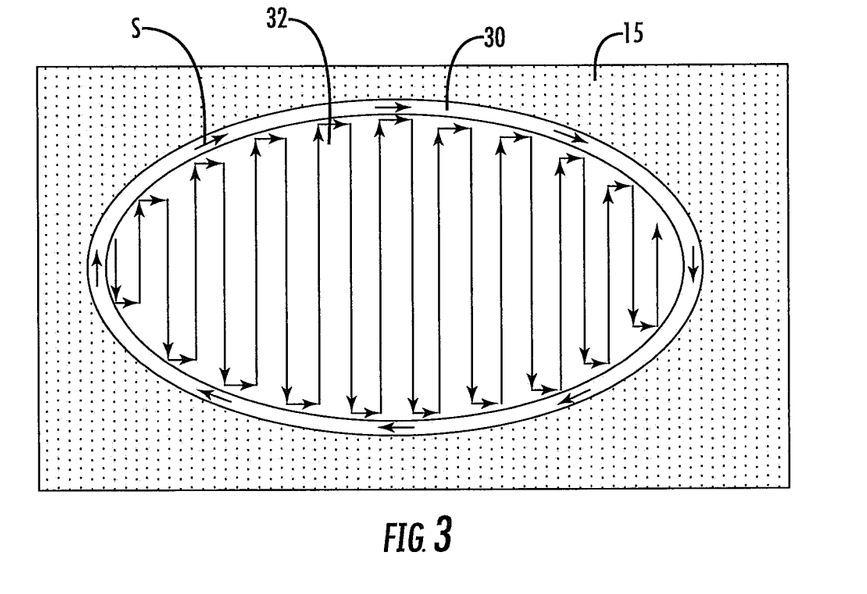
FIG. 3 is a diagram illustrating an embodiment of a horizontal cross-section of a layer of powder being selectively fused.

FIG. 3 is a diagram illustrating a horizontal cross-section of a layer of powder 15 being selectively fused. In the illustrated embodiment, an oval shape is being fused using an outer contour 30 surrounding a hatch pattern 32. In the illustrated embodiment, the arrows indicate a variable scan direction S for forming the contour. In the illustrated embodiment, the hatch pattern 32 is formed by a first energy beam 18.

In the illustrated embodiment, the hatch pattern 32 includes a back and forth arrangement and sequence of beam scans to solidify the entire area of powder 15 within the hatch pattern. The back and forth arrangement is indicated in FIG. 3 by arrow orientation which is opposing or opposite for adjacent scans. The illustrated hatch pattern scans down a full height of the hatch pattern 32, then increments to the right by a melt width, scans up for a full height of the hatch pattern 32, then increments right by a melt width, and so on. While the scans are illustrated as vertical, they can be horizontal with vertical incremental movement between horizontal scans. The scans can also be oblique relative to X and Y. The incremental melt width movement is generally not necessarily exactly transverse to the scan direction.

The contour 30 is formed by a second energy beam 18. A number N scans used to form the contour 30 is a function of a lateral alignment uncertainty of the first beam 18 with respect to the second beam 18. In another illustrative embodiment, the first energy beam 18 is utilized to form a first portion of the hatch pattern 32. The second energy beam 18 is used to form the contour 30 and a second portion of the hatch pattern 32. The first and second energy beams 18 operate concurrently.

Figure 4:
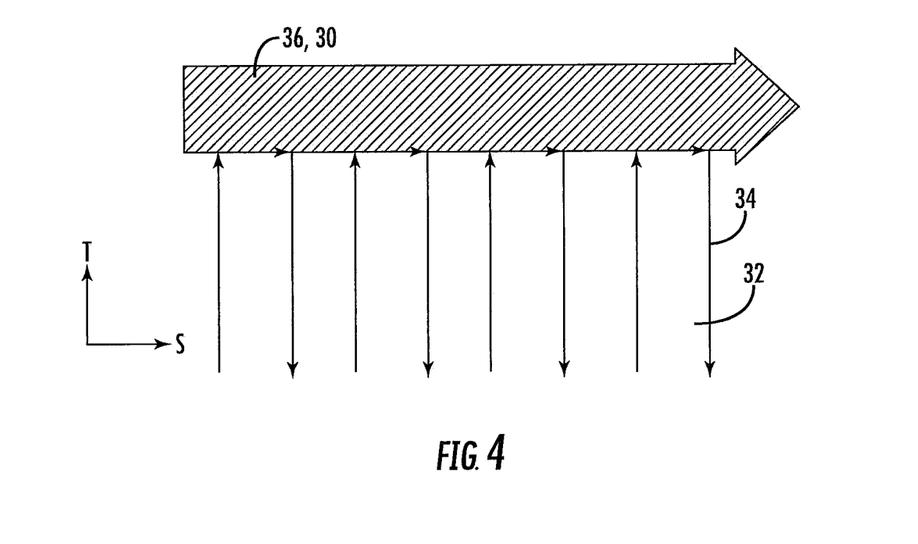
FIG. 4 is a diagram depicting a contour and a hatch pattern for which the number N of contour scans equals one.

FIG. 4 is a diagram depicting a contour 30 and a hatch pattern 32 for which the number N of contour scans equals one. The hatch pattern 32 is formed from a continuous sequence of scans 34 of the first energy beam 18. As the energy beam 18 scans, there is a melt width which is transverse to the scan direction and has a magnitude that is equal to or greater than a transverse distance between scans.

A single contour scan 36 of the second energy beam 18 along the axis S defines the contour 30. In this embodiment, the lateral alignment uncertainty between the first and second energy beams 18 is small enough so that a single scan will provide excellent material properties and a smooth finish along the contour 30.

Figure 5A:
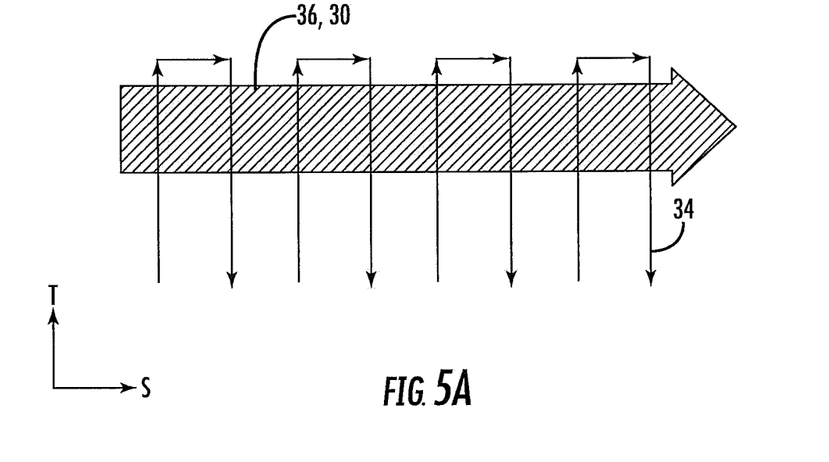
FIG. 5A is a diagram depicting a single scan contour and a hatch pattern in which the hatch pattern extends outside of the melt width of the contour which increases a surface roughness.
Figure 5B:
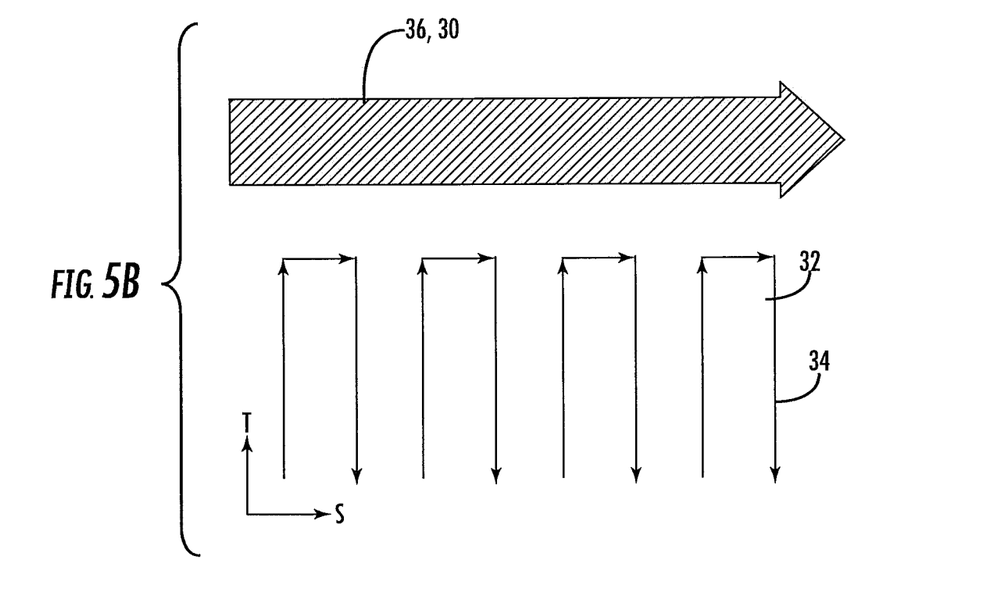
FIG. 5B is a diagram depicting a single scan contour and a hatch pattern in which the hatch pattern melt pattern does not intersect the contour melt pattern, resulting in a subsurface defect.

FIGS. 5A and 5B are diagrams depicting larger lateral alignment uncertainties in which more than one contour scan 36 is required but in which only a single contour scan is employed for illustrative purposes. For FIG. 5A, the hatch scans 34 extend too far in the +T direction and to a region outside of the single scan 36 contour 30. The result will be an increased surface roughness on an outside surface of a 3D article 4. For FIG. 5B, the hatch scans 34 don't extend far enough in the +T direction. The melt zone of the hatch scans 34 don't reach the melt zone of the contour scan 36. As a result, there is unfused powder between the contour 30 and the hatch pattern 32. The result is subsurface defects and a generally weakened material near the surface of the 3D article 4.

Figure 6:
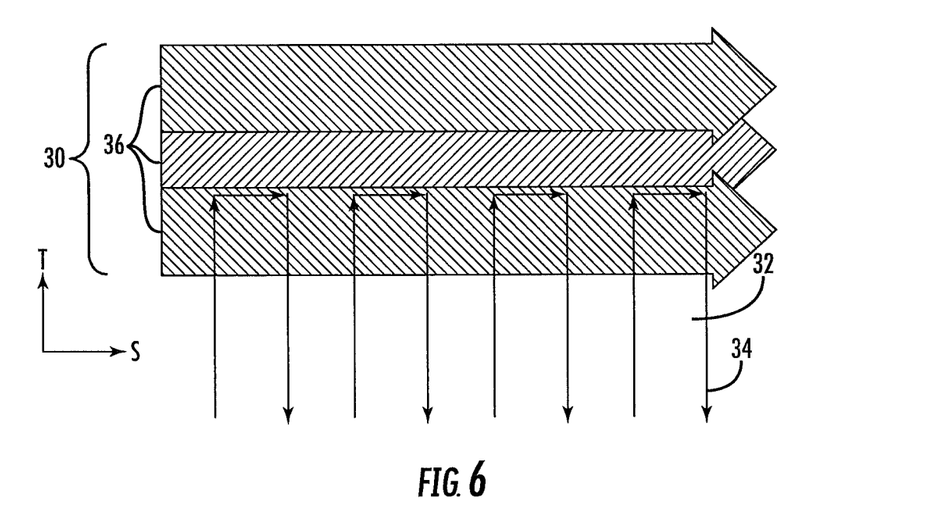
FIG. 6 is a diagram depicting a contour and hatch pattern in which the contour is formed from three contour scans. The three contour scans are scanned along a variable axis S and are mutually offset from each other along a transverse axis T.

FIG. 6 is a diagram depicting a hatch pattern 32 and contour 30 for which N=3. A nominal (specified) alignment of the hatch scans 34 is also illustrated. Having N=3 allows a lateral alignment uncertainty along T to be up to about equal to 1 to 1.5 times the melt width of a contour scan 36. In practice, the contour scans 36 have an overlap such that the three contour scans 36 at least double the width of the contour 30.

Figure 7:
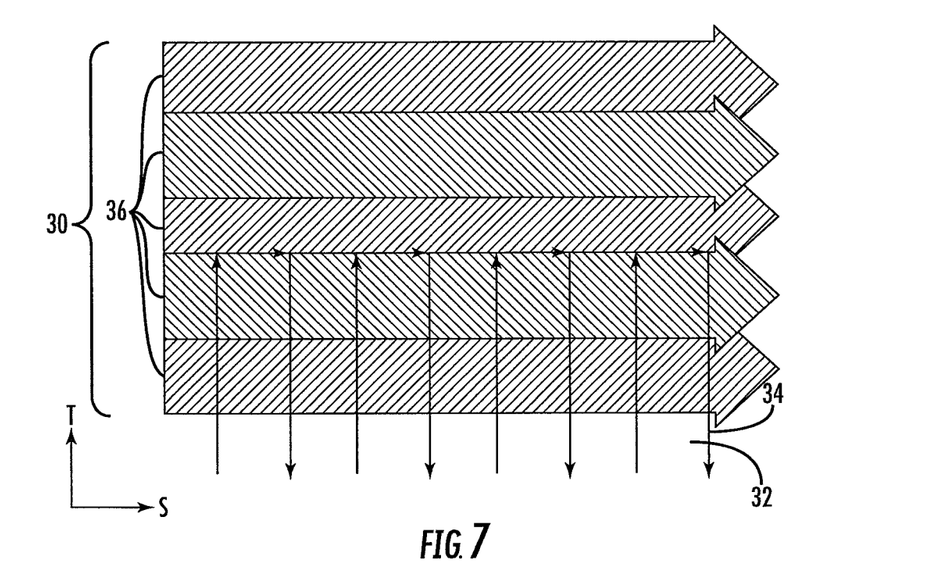
FIG. 7 is a diagram depicting a contour and hatch pattern in which the contour is formed from five contour scans. The five contour scans are scanned along a variable axis S and are mutually offset from each other along a transverse axis T.

FIG. 7 is a diagram depicting a hatch pattern 32 and contour 30 for which N=5. A nominal (specified) alignment of the hatch scans 34 is also illustrated. Having N=5 allows a lateral alignment uncertainty along T to be up to about 1.5-2.5 times the melt width of a contour scan 36. In practice, the contour scans 36 have an overlap such that the five contour scans 36 at least triple the width of the contour 30 relative to a single scan.

Figure 8:
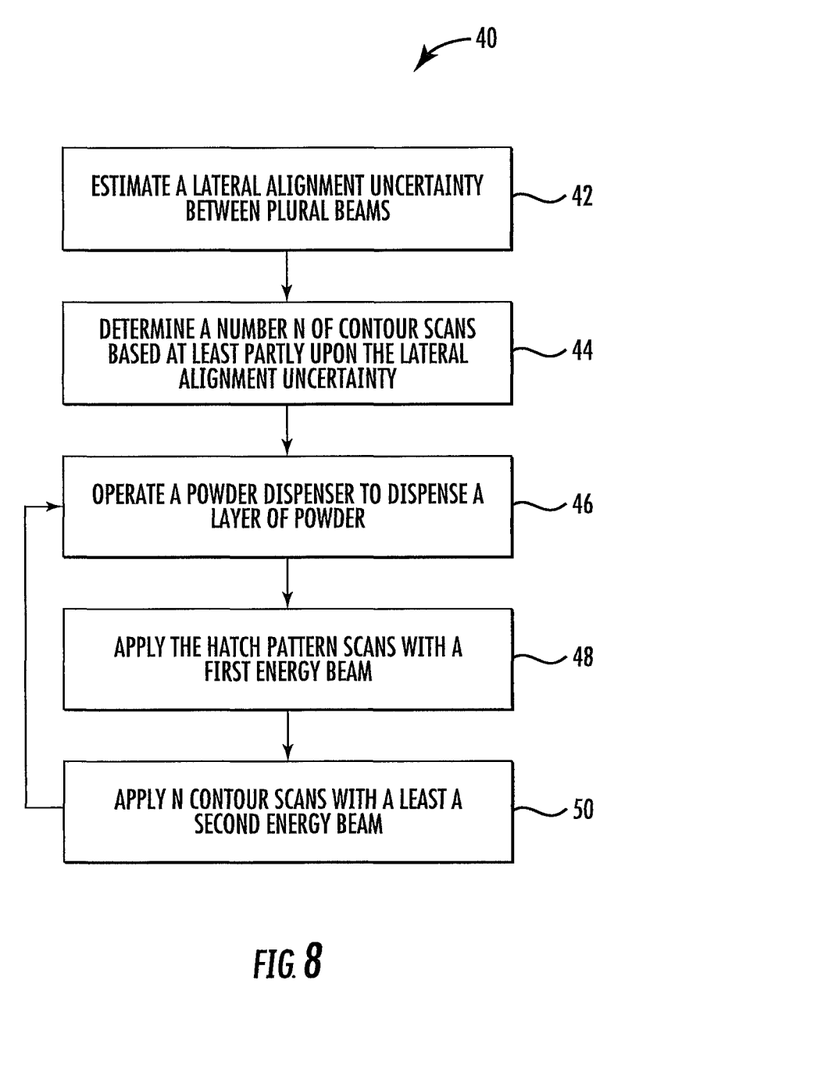
FIG. 8 is a flowchart depicting a method of manufacturing a three-dimensional (3D) article.

FIG. 8 is a flowchart depicting a method 40 of manufacturing a 3D article 4. According to 42, controller 20 estimates a lateral alignment uncertainty between plural energy beams 18 which include a first beam and a second beam.

According to 44, a number N of contour scans is determined based at least upon the lateral alignment uncertainty.

According to 46, controller 20 operates the powder dispenser 14 to dispense a layer of powder 15. According to 48, controller 20 operates at least the first energy beam to scan a hatch pattern 32 over the build plane 19 to solidify areas of 3D article 4. According to 50, the controller 20 operates at least the second energy beam to solidify a contour 30 using N separate scans along a variable contour axis S. The N separate scans are laterally offset from each other along a transverse axis T. The overall width of the contour S along the transverse axis T is equal to N times a melt width minus a cumulative overlap of the scans. Steps 46-50 are repeated for individual layers of selectively fused powder.

Figure 9:
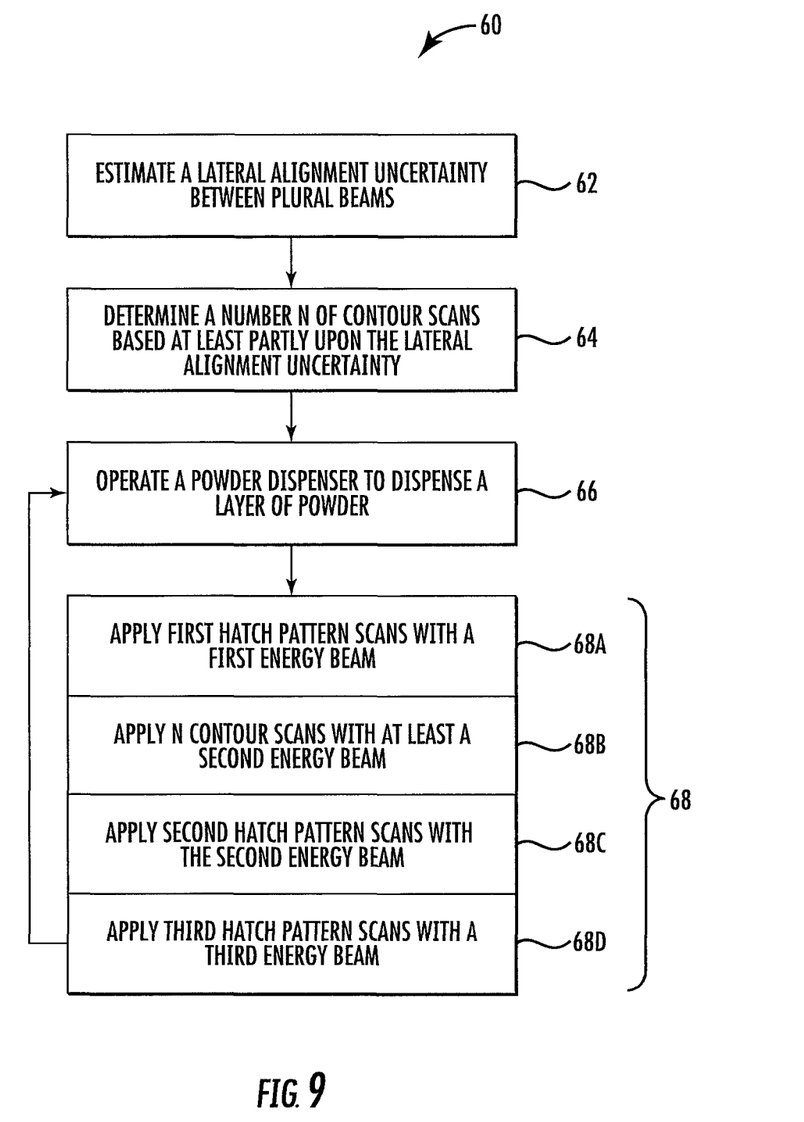
FIG. 9 is a flowchart depicting a particular method of manufacturing a three-dimensional (3D) article.

In an embodiment, step 48 occurs before step 50. In another embodiment, steps 48 and 50 occur concurrently. In yet another embodiment, step 48 occurs after step 50. Different variations are possible. Some temporal overlap or concurrency between steps 48 and 50 is preferable to minimize the time required for these steps. FIG. 9 is intended to illustrate one such variation more specifically.

FIG. 9 is a flowchart depicting a particular method 60 of manufacturing a 3D article 4. Steps 62-66 of FIG. 9 are similar to steps 42-46 of FIG. 8 respectively.

A step 68 is a grouping of steps 68A, 68B, 68C, and 68D which occur at least partially concurrently for temporal efficiency purposes and in no particular order. According to 68A, the first beam 18 fuses a first hatch pattern 18. According to 68B, a second beam 18 fuses the contour 30 using N separate scans along a variable contour S. The N separate scans are laterally offset from each other along a transverse axis T. The overall width of the contour S along the transverse axis T is equal to N times a melt width minus a cumulative overlap of the scans. According to 68C, the second beam 18 is used to fuse a second hatch pattern 32. According to 68D, a third beam 18 is used to fuse a third hatch pattern 32. Steps 66-68 are repeated for selectively fusing layers of powder.

The specific embodiments and applications thereof described above are for illustrative purposes only and do not preclude modifications and variations encompassed by the scope of the following claims.

What is claimed:

1. A method of manufacturing a three-dimensional (3D) article comprising:
    determining a lateral alignment uncertainty for a system, the system including a powder dispenser for sequentially dispensing individual layers of powder and a fusing apparatus for generating and scanning a plurality of energy beams including a first beam and a second beam to selectively melt the layers of powder, the lateral alignment uncertainty is with respect to at least the first beam and the second beam;
    determining a number N of overlapping scans for forming a contour that bounds a hatch pattern, N is an integer at least equal to one, the determination is based at least partly upon the lateral alignment uncertainty;
    operating the powder dispenser to dispense a layer of powder; and
    operating the fusing apparatus to selectively fuse the powder including:
        operating at least the first beam to fuse a first hatch pattern over an area of the layer of powder; and
        operating at least the second beam to fuse a contour using the N overlapping scans to form the contour having a contour width that is equal to N times a melt width of a single scan minus a cumulative overlap of the N overlapping scans.

2. The method of claim 1 wherein the plurality of energy beams includes a third beam, the method further comprises operating the third beam to fuse a second hatch pattern over a second area of the layer of powder.

3. The method of claim 1 wherein N is monotonically related to the lateral alignment uncertainty.

4. The method of claim 1 wherein N is proportional to or increasing with the lateral alignment uncertainty.

5. The method of claim 1 wherein N times the melt width of a single scan is at least equal to the lateral alignment uncertainty.

6. A computer-readable storage medium for manufacturing a three-dimensional (3D) article, the computer-readable storage medium being non-transitory and having computer-readable program code portions stored therein that in response to execution by a processor cause a three-dimensional (3D) printing system to:
    determine a lateral alignment uncertainty for a system, the system including a powder dispenser for sequentially dispensing individual layers of powder and a fusing apparatus for generating and scanning a plurality of energy beams including a first beam and a second beam to selectively melt the layers of powder, the lateral alignment uncertainty is with respect to at least the first beam and the second beam; and
    determine a number N of overlapping scans for forming a contour that bounds a hatch pattern, N is an integer at least equal to one, the determination is based at least partly upon the lateral alignment uncertainty;
    operate the powder dispenser to dispense a layer of powder; and
    operate the fusing apparatus to selectively fuse the powder including:
        operate at least the first beam to fuse a first hatch pattern over an area of the layer of powder; and
        operate at least the second beam to fuse a contour using the N overlapping scans to form the contour having a contour width that is equal to N times a melt width of a single scan minus a cumulative overlap of the N overlapping scans.

7. The computer-readable storage medium of claim 6 wherein the plurality of energy beams includes a third beam, execution by the processor further causes three-dimensional (3D) printing system to fuse a second hatch pattern over a second area of the layer of powder.

8. The computer-readable storage medium of claim 6 wherein N is monotonically related to the lateral alignment uncertainty.

9. The computer-readable storage medium of claim 6 wherein N is proportional to or increasing with the lateral alignment uncertainty.

10. The computer-readable storage medium of claim 6 wherein N times the melt width of a single scan is at least equal to the lateral alignment uncertainty.

* * * * *